(12) United States Patent
Ueda (10) Patent No.: US 11,367,609 B2
(45) Date of Patent: Jun. 21, 2022

(54) MASS SPECTROMETER

(71) Applicant: SHIMADZU CORPORATION, Kyoto (JP)

(72) Inventor: Manabu Ueda, Kyoto (JP)

(73) Assignee: SHIMADZU CORPORATION, Kyoto ( * ) Notice: Subject to any disclaimer, the term of this patent is extended or adjusted under 35 U.S.C. 154(b) by 0 days.

(21) Appl. No.: 17/262,259

(22) PCT Filed: Sep. 13, 2018

(86) PCT No.: PCT/JP2018/033933
§ 371 (c)(1),
(2) Date: Jan. 22, 2021

(87) PCT Pub. No.: WO2020/054013
PCT Pub. Date: Mar. 19, 2020

(65) Prior Publication Data
US 2021/0287896 A1 Sep. 16, 2021

(51) Int. Cl.
*H01J 49/42* (2006.01)
*H01J 49/06* (2006.01)
(Continued)

(52) U.S. Cl.
CPC ........ *H01J 49/4215* (2013.01); *H01J 49/063* (2013.01); *H01J 49/067* (2013.01); *H01J 49/165* (2013.01); *H01J 49/24* (2013.01)

(58) Field of Classification Search
CPC .......... H01J 49/005; H01J 49/06; H01J 49/10; H01J 49/0031; H01J 49/062; H01J 49/063;
(Continued)

(56) References Cited

U.S. PATENT DOCUMENTS

2015/0108348 A1* 4/2015 Mukaibatake .......... H01J 49/10
250/290
2016/0314949 A1* 10/2016 Asano .................... H01J 49/165
2019/0333750 A1 10/2019 Saito et al.

FOREIGN PATENT DOCUMENTS

WO 2018/116443 A1 6/2018

OTHER PUBLICATIONS

International Search Report for PCT/JP2018/033933 dated Dec. 4, 2018 (PCT/ISA/210).
(Continued)

*Primary Examiner* — David E Smith
*Assistant Examiner* — Hsien C Tsai
(74) *Attorney, Agent, or Firm* — Sughrue Mion, PLLC (57) ABSTRACT

A mass spectrometer adopting a configuration of a multi-stage differential evacuation system appropriately performs optimization of a direct-current voltage applied to a plurality of ion optical elements for transporting ions. An auto-tuning controller acquires intensity data of ions derived from a predetermined component while changing a direct-current voltage applied to ion guides and the like, and searches for a direct-current voltage at which the intensity is maximized. When the direct-current voltage applied to a certain ion optical element is changed at the time of automatic adjustment, the direct-current voltage applied to all the ion optical elements thereafter is also changed by the same amount. Since the direct-current voltage difference between two adjacent ion optical elements always changes at only one point, the direct-current potential difference can be determined so as to optimize the ion passage efficiency.

8 Claims, 4 Drawing Sheets

(51) Int. Cl.
*H01J 49/16* (2006.01)
*H01J 49/24* (2006.01)

(58) Field of Classification Search
CPC .... H01J 49/0045; H01J 49/009; H01J 49/165; H01J 49/0422; H01J 49/0409; G01N 27/62
See application file for complete search history.

(56) References Cited

OTHER PUBLICATIONS

Written Opinion for PCT/JP2018/033933 dated Dec. 4, 2018 (PCT/ISA/237).

* cited by examiner

DEVICE OF PRESENT INVENTION

Fig. 4B

CONVENTIONAL DEVICE

MASS SPECTROMETER

CROSS REFERENCE TO RELATED APPLICATIONS

This application is a National Stage of International Application No. PCT/W2018/033933 filed Sep. 13, 2018.

TECHNICAL FIELD

The present invention relates to a mass spectrometer, and more particularly, a mass spectrometer having a multi-stage differential evacuation system in which an ion source is an atmospheric pressure ion source and a mass separator is disposed in an analysis chamber having a high vacuum space.

BACKGROUND ART

A mass spectrometer used as a detector of a liquid chromatograph (LC) usually includes an atmospheric pressure ion source utilizing an ionization method such as electrospray ionization (ESI), atmospheric pressure chemical ionization (APCI), or atmospheric pressure photoionization (APPI) in order to ionize a component in a liquid sample. In such a mass spectrometer, ions generated under an atmospheric pressure need to be transported to an analysis chamber in which a mass separator such as a quadrupole mass filter is disposed. In order to maintain the inside of the analysis chamber at a high vacuum, a multi-stage differential evacuation system is adopted in which a plurality of intermediate vacuum chambers are provided between the ionization chamber and the analysis chamber.

In such a mass spectrometer, it is necessary to transport ions derived from a sample component generated by an ion source to a mass separator with high efficiency, i.e., with as little loss as possible, and a plurality of ion optical elements that converges or attracts ions by the action of an electric field is disposed between the atmospheric pressure ion source and the mass separator. For example, in the triple quadrupole mass spectrometer described in Patent Literature 1, ions generated in an atmospheric pressure ion source are transported to a vacuum region through a desolvation tube, then sent to a region of a higher degree of vacuum through a plurality of ion lenses (ion guides), a skimmer formed with ion passage holes, and the like, and introduced into a quadrupole mass filter which is a mass separator.

In a mass spectrometer in which a path through which ions pass is formed by an electric field formed by each of the plurality of ion optical elements, it is necessary to appropriately set a direct-current voltage (direct-current bias voltage) applied to each ion optical element in order to efficiently transport ions. Generally, the optimum voltage applied to those elements depends on the mass-to-charge ratio of the ions to be measured, and there are many ion optical elements whose voltage is to be adjusted, so that manual adjustment is laborious. For this reason, as disclosed in Patent Literature 1, recent mass spectrometers are equipped with an auto-tuning function which automatically adjusts voltages applied to a plurality of ion optical elements while observing the ion intensity corresponding to a specific component by performing an analysis on a standard sample.

CITATION LIST

Patent Literature

Patent Literature 1: WO 2018/116443 A

SUMMARY OF INVENTION

Technical Problem

In general, in automatic adjustment of voltage using the auto-tuning function, the direct-current voltages applied to a plurality of ion optical elements are adjusted one by one in a predetermined order so that the ion intensity corresponding to a specific component becomes as high as possible. Consequently, the direct-current voltage to be applied to each ion optical element is finally determined so that the detection sensitivity for the specific component becomes the highest state or a state close thereto.

However, the mass spectrometer in which the direct-current voltage is determined as described above has the following problems.

(1) The relationship between the direct-current voltage applied to an adjustment target ion optical element and that applied to the ion optical elements before and after the adjustment target ion optical element is not necessarily adjusted appropriately, so that the detection sensitivity is not adjusted to the optimum state.

(2) When the direct-current voltage applied to each ion optical element is changed, the peak shape on the mass spectrum is changed, and the mass resolution after adjustment may deteriorate.

The present invention has been made to solve the above problems, and its main object is to provide a mass spectrometer capable of realizing high detection sensitivity by appropriately adjusting a direct-current voltage applied to an ion optical element, and achieving both the high detection sensitivity and good peak shape of a mass spectrum.

Solution to Problem

The present invention made to solve the above problem is a mass spectrometer which includes an ion source configured to ionize a component in a sample, an ion detector configured to detect an ion generated by the ion source or an ion derived from the ion, and a plurality of ion optical elements configured to affect an ion behavior, the plurality of ion optical elements including a mass separator which is disposed between the ion source and the ion detector and configured to separate an ion generated by the ion source or an ion derived from the ion in accordance with its mass-to-charge ratio, the mass spectrometer including a voltage generation unit configured to apply a direct-current voltage to each of the plurality of ion optical elements; and an automatic adjustment controller configured to adjust a direct-current voltage by controlling the voltage generation unit so as to change the direct-current voltage applied to the ion optical element while observing an ion intensity with respect to a predetermined component, wherein, when adjusting a direct-current voltage applied to an adjustment target ion optical element, which is one of the plurality of ion optical elements, the automatic adjustment controller controls the voltage generation unit so that a direct-current voltage applied to one or a plurality of ion optical elements positioned in a subsequent stage of the adjustment target ion optical element is changed by the same amount as the direct-current voltage applied to the adjustment target ion optical element.

Normally the initial state of the applied voltage to each ion optical element before the adjustment of the direct-current voltage by the automatic adjustment controller can be, for example, a default value determined by the manufacturer of the present device on the basis of experimental results obtained by analyzing a standard sample, or a value set by automatic adjustment or a manual operation of the user at the time of the previous analysis.

The "ion optical element" in the present invention is one that forms an electric field having various effects on an ion behavior, such as converging ions, accelerating ions, decelerating ions, bending the trajectory of ions, selecting a specific ion, and diverging other ions, and specifically includes an ion guide, an ion lens, an ion deflector, an ion funnel, a skimmer (skimmer electrode), an aperture electrode, and a quadrupole mass filter.

The mass spectrometer according to the present invention is typically, though not limited to, a mass spectrometer having a configuration of a multi-stage differential evacuation system equipped with an ion source by an atmospheric pressure ionization method such as the electrospray ionization, the atmospheric pressure chemical ionization, or the atmospheric pressure photoionization. This is because a relatively large number of ion optical elements are required in a mass spectrometer having such a configuration in order to transport ions generated in an ion source under atmospheric pressure to a mass separator disposed in a high vacuum.

In the present invention, the automatic adjustment controller controls the voltage generation unit so as to change the direct-current voltage applied to each ion optical element while observing the ion intensity for a specific component in a predetermined standard sample, for example. Then, the automatic adjustment controller acquires an ion intensity signal every time the applied voltage changes, and searches for a direct-current voltage at which the ion intensity signal becomes maximum. In the automatic adjustment by the conventional device, when changing the direct-current voltage applied to the adjustment target ion optical element which is one of the plurality of ion optical elements, the direct-current voltage applied to the other ion optical elements is fixed. On the other hand, in the mass spectrometer according to the present invention, a direct-current voltage applied to one or a plurality of ion optical elements positioned in a subsequent stage of the adjustment target ion optical element is changed by the same amount as the direct-current voltage applied to the adjustment target ion optical element.

Therefore, in the mass spectrometer according to the present invention, when the direct-current voltage applied to the adjustment target ion optical element is changed, the direct-current voltage difference between the adjustment target ion optical element and another ion optical element positioned just in front of the ion optical element in the ion passing direction is changed, but the direct-current voltage difference between the adjustment target ion optical element and another ion optical element positioned just behind the ion passing direction is not changed. That is, in the conventional device, the direct-current voltage difference at two points just in front of and just behind the adjustment target ion optical element simultaneously changes, whereas in the mass spectrometer according to the present invention, only the direct-current voltage difference at one point of just in front of the adjustment target ion optical element changes.

When the direct-current voltage difference at two points is simultaneously changed by changing the applied voltage to an adjustment target ion optical element as in the conventional device, both the applied voltage to the ion optical element positioned on the upstream side and the downstream side of the ion stream of the adjustment target ion optical element and the voltage difference between the adjustment target ion optical element and the ion optical elements before and after the adjustment target ion optical element are changed. Therefore, the direct-current voltage determined by the automatic adjustment is not necessarily a condition that gives the maximum ion intensity. On the other hand, in the present invention, the direct-current voltage difference between the ion optical elements adjacent to each other in the ion passing direction can be determined one by one, and the voltage difference determined so as to maximize the ion intensity signal at a certain point of time does not change even if the direct-current voltage to another ion optical element changes. Thus, a more appropriate voltage condition can be determined as a condition that gives the maximum ion intensity.

In the present invention, in particular, it is preferable that one or a plurality of ion optical elements positioned in a subsequent stage of the adjustment target ion optical element include a quadrupole mass filter.

In this configuration, if the voltage applied to the quadrupole mass filter is changed by the same amount as the direct-current voltage applied to the adjustment target ion optical element, even if the applied voltage of the adjustment target ion optical element is changed, the direct-current potential difference between the ion optical element and the quadrupole mass filter does not change. Therefore, the incident energy of the ions incident on the quadrupole mass filter is kept constant regardless of the direct-current voltage applied to the adjustment target ion optical element, whereby it is possible to suppress the change of the peak shape on the mass spectrum and to alleviate the deterioration in mass resolution.

As an aspect of a mass spectrometer according to the present invention, the mass spectrometer can have a configuration in which the ion source is an atmospheric pressure ion source, the mass separator and the ion detector are disposed in an analysis chamber having a high vacuum, and two or more intermediate vacuum chambers in which a degree of vacuum is increased in a stepwise manner are provided between the atmospheric pressure ion source and the analysis chamber, and the adjustment target ion optical element is an ion guide disposed in a first intermediate vacuum chamber positioned in a next stage of the atmospheric pressure ion source.

Furthermore, in another aspect of a mass spectrometer according to the present invention, the mass spectrometer may have a configuration in which the ion source is an atmospheric pressure ion source, the mass separator and the ion detector are disposed in an analysis chamber having a high vacuum, and two or more intermediate vacuum chambers in which a degree of vacuum is increased in a stepwise manner are provided between the atmospheric pressure ion source and the analysis chamber, and the adjustment target ion optical element is an ion guide disposed in a second intermediate vacuum chamber positioned in the second stage behind the atmospheric pressure ion source.

Since, in those aspects, the pressure in the first intermediate vacuum chamber or the second intermediate vacuum chamber is relatively high (i.e., there is a certain amount of residual gas), an ion guide that converges, by the action of a high-frequency electric field, ions cooled by contact with the residual gas may be used as the ion guide disposed in the first intermediate vacuum chamber or the second intermediate vacuum chamber.

As another aspect of a mass spectrometer according to the present invention, the mass spectrometer can have a configuration in which the ion source is an atmospheric pressure ion source, the mass separator and the ion detector are disposed in an analysis chamber having a high vacuum, and two or more intermediate vacuum chambers in which a degree of vacuum is increased in a stepwise manner are provided between the atmospheric pressure ion source and the analysis chamber, and the adjustment target ion optical element is an ion lens having an opening through which ions pass, provided in a partition wall separating a first intermediate vacuum chamber positioned in a next stage of the atmospheric pressure ion source from a second intermediate vacuum chamber positioned in a next stage of the first intermediate vacuum chamber.

As another aspect of a mass spectrometer according to the present invention, the mass spectrometer can have a configuration in which the ion source is an atmospheric pressure ion source, the mass separator and the ion detector are disposed in an analysis chamber having a high vacuum, and two or more intermediate vacuum chambers in which a degree of vacuum is increased in a stepwise manner are provided between the atmospheric pressure ion source and the analysis chamber, and the adjustment target ion optical element is an ion lens having an opening through which ions pass, provided in a partition wall separating a second intermediate vacuum chamber positioned in the second stage behind the atmospheric pressure ion source from a third intermediate vacuum chamber positioned further in a next stage of the second intermediate vacuum chamber or an analysis chamber.

In those aspects, the ion lens having an opening through which ions pass is, for example, a skimmer or an aperture electrode in which an ion passage hole is formed at the apex.

Of course, the number of intermediate vacuum chambers can be further increased, and even in such case, the mass spectrometer can have the same configuration as that of the above aspect.

That is, as yet another aspect of a mass spectrometer according to the present invention, the mass spectrometer may have a configuration in which the ion source is an atmospheric pressure ion source, the mass separator and the ion detector are disposed in an analysis chamber having a high vacuum, and three or more intermediate vacuum chambers in which a degree of vacuum is increased in a stepwise manner are provided between the atmospheric pressure ion source and the analysis chamber, and the adjustment target ion optical element is an ion guide disposed in a third intermediate vacuum chamber positioned in the third stage behind the atmospheric pressure ion source.

As yet another aspect of a mass spectrometer according to the present invention, the mass spectrometer may have a configuration in which the ion source is an atmospheric pressure ion source, the mass separator and the ion detector are disposed in an analysis chamber having a high vacuum, and three or more intermediate vacuum chambers in which a degree of vacuum is increased in a stepwise manner are provided between the atmospheric pressure ion source and the analysis chamber, and the adjustment target ion optical element is an ion lens having an opening through which ions pass, provided in a partition wall separating a third intermediate vacuum chamber positioned in the third stage behind the atmospheric pressure ion source from a fourth intermediate vacuum chamber positioned further in a next stage of the third intermediate vacuum chamber or an analysis chamber.

Advantageous Effects of Invention

According to a mass spectrometer according to the present invention, it is possible to appropriately adjust the direct-current voltage applied to each of the plurality of ion optical elements, and it is possible to achieve high detection sensitivity by increasing the amount of ions finally reaching the ion detector. In particular, by a configuration in which the voltage applied to the quadrupole mass filter positioned on the downstream side of the ion stream of the adjustment target ion optical element is changed by the same amount as the direct-current voltage applied to the adjustment target ion optical element, it is possible to alleviate the deterioration in mass resolution due to the adjustment of the direct-current voltage applied to the adjustment target ion optical element.

DESCRIPTION OF EMBODIMENTS

A mass spectrometer of an example of the present invention will be described below with reference to the accompanying drawings.

Figure 1:
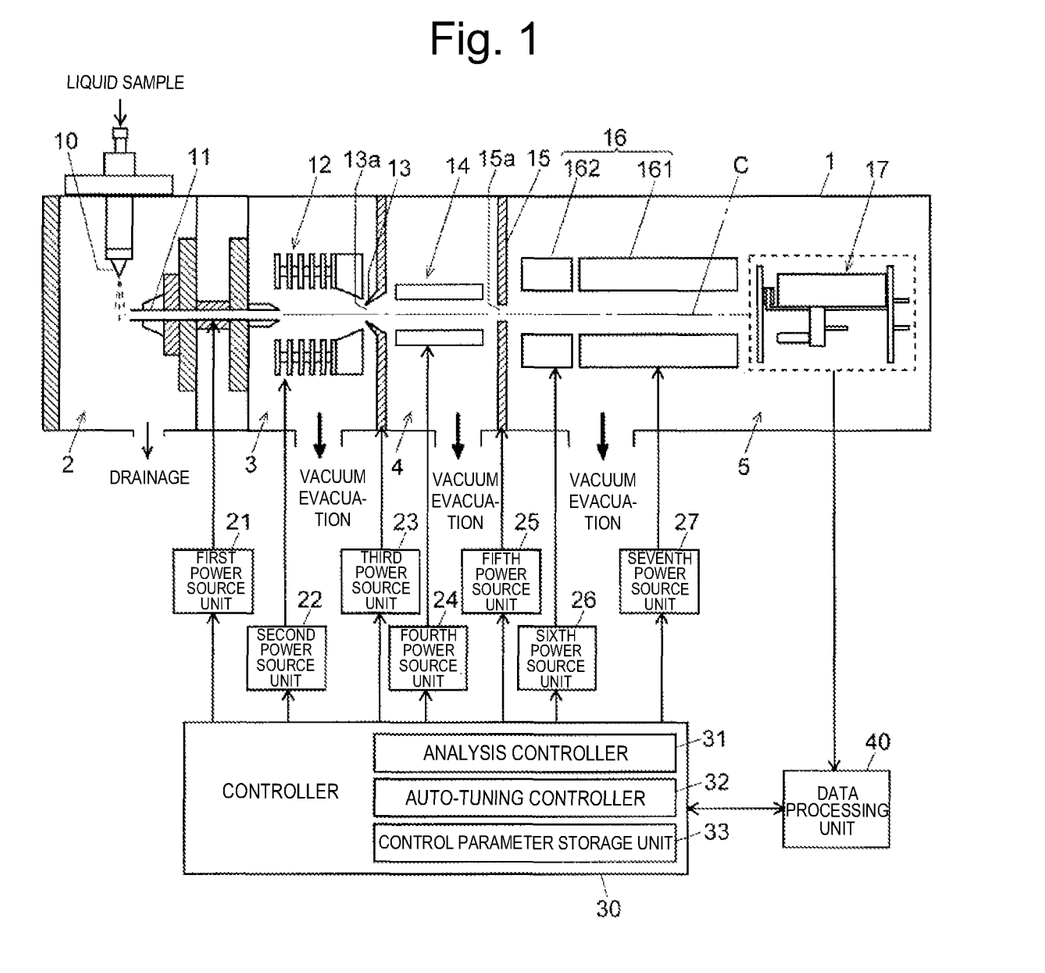
FIG. 1 is a schematic diagram of a mass spectrometer of an example of the present invention.

FIG. 1 is a schematic diagram of a single type quadrupole mass spectrometer of the present example.

The mass spectrometer of the present example has an ionization chamber 2 for ionizing a component (compound) in a liquid sample under a substantially atmospheric pressure in a casing 1, and an analysis chamber 5 maintained in a high vacuum for mass-separating and detecting ions derived from a sample component, and has, between the ionization chamber 2 and the analysis chamber 5, a first intermediate vacuum chamber 3 and a second intermediate vacuum chamber 4 in which a degree of vacuum is increased in a stepwise manner. The first intermediate vacuum chamber 3 is evacuated by a rotary pump not shown, and the second intermediate vacuum chamber 4 and the analysis chamber 5 are evacuated by both the rotary pump and a turbo-molecular pump not shown. That is, this mass spectrometer has a configuration of a multi-stage differential evacuation system, whereby the inside of the analysis chamber 5, which is the final stage, is maintained to a high degree of vacuum.

In the ionization chamber 2, an electrospray ionization (ESI) probe 10 configured to ionize a component in a liquid sample by electrostatically nebulizing the sample is disposed. The ionization chamber 2 and the first intermediate vacuum chamber 3 communicate with each other through a desolvation tube 11, which is a capillary tube heated to an appropriate temperature. Here, the nebulization direction of the droplet by the ESI probe 10 and the ion suction direction by the desolvation tube 11 are in a relationship of substantially orthogonal to each other, but they may not necessarily be orthogonal to each other.

In the first intermediate vacuum chamber 3, a Q array ion guide 12 which transports ions while converging them by an action of a high-frequency electric field is disposed. This Q array ion guide 12 has a configuration in which four virtual rod-like electrodes are disposed so as to surround an ion optical axis C, and one virtual rod-like electrode includes a plurality of electrodes divided in the extension direction of the ion optical axis C. A space surrounded by the virtual rod-like electrodes in the Q array ion guide 12 gradually narrows in the ion travel direction.

The first intermediate vacuum chamber 3 and the second intermediate vacuum chamber 4 communicate with each other through a minute ion passage hole (orifice) 13a formed at the apex of a substantially conical skimmer 13. In the second intermediate vacuum chamber 4, a quadrupole ion guide 14 which transports ions while converging them by an action of a high-frequency electric field is disposed. This quadrupole ion guide 14 includes four rod electrodes disposed parallel to the ion optical axis C so as to surround the ion optical axis C. The second intermediate vacuum chamber 4 and the analysis chamber 5 communicate with each other through a minute ion passage hole 15a formed in a flat aperture electrode 15.

In the analysis chamber 5, a quadrupole mass filter 16 as a mass separator and an ion detector 17 are disposed. The quadrupole mass filter 16 includes a main filter 161 and a prefilter 162, and the main filter 161 has a configuration in which four rod electrodes extending parallel to the ion optical axis C are disposed around the ion optical axis C. The prefilter 162 includes four rod electrodes shorter than the rod electrodes constituting the main filter 161. The ion detector 17 includes, for example, a conversion dynode and a secondary electron multiplier tube.

A direct-current voltage or a voltage obtained by adding a high-frequency voltage and a direct-current voltage is applied from first to seventh power source units 21 to 27 to the desolvation tube 11, the Q array ion guide 12, the skimmer 13, the quadrupole type ion guide 14, the aperture electrode 15, and the prefilter 162 and the main filter 161 of the quadrupole mass filter 16, respectively, arranged along the ion optical axis C. More specifically, voltages obtained by adding a direct-current bias voltage to a high-frequency voltage for forming a high-frequency electric field that converges ions are applied to the Q array ion guide 12 and the quadrupole ion guide 14, respectively. A direct-current bias voltage is applied to the desolvation tube 11, the skimmer 13, and the aperture electrode 15, respectively. A voltage obtained by further adding a direct-current bias voltage to a high-frequency voltage and a direct-current voltage for forming a quadrupole electric field that separates ions in accordance with a mass-to-charge ratio is applied to the main filter 161 of the quadrupole mass filter 16. A voltage obtained by adding a direct-current bias voltage to a high-frequency voltage applied to the main filter 161 is applied to the prefilter 162 of the quadrupole mass filter 16.

Although not described here, a predetermined direct-current voltage is also applied to the ESI probe 10 and the ion detector 17 from a power source unit not shown. The first to seventh power source units 21 to 27 are each controlled by a controller 30. The controller 30 includes an analysis controller 31 and an auto-tuning controller 32 as functional blocks. The detection signal by the ion detector 17 is input to a data processing unit 40.

A general analysis operation performed under the control of the analysis controller 31 in the mass spectrometer of the present example will be briefly described.

At the time of analysis, a direct-current high voltage of, for example, several kV is applied to the tip of the ESI probe 10. The polarity of the voltage depends on the polarity of the ion to be measured. For example, when a liquid sample eluted from an LC column not shown is introduced into the ESI probe 10, a charge is given to the liquid sample at the tip of the probe 10, and the liquid sample is nebulized into the ionization chamber 2 as a minute charged droplet. In the ionization chamber 2, the solvent in the charged droplet evaporates while the charged droplet is brought into contact with the surrounding air to become fine. In the process, the sample component in the droplet is discharged with a charge, and ions derived from the sample component are generated. Since there is a pressure difference between the inlet end and the outlet end of the desolvation tube 11, a gas flow flowing from the ionization chamber 2 side to the first intermediate vacuum chamber 3 is formed in the desolvation tube 11. Therefore, as described above, the ions generated in the ionization chamber 2 are sucked into the desolvation tube 11 and sent into the first intermediate vacuum chamber 3. At this time, a part of the fine charged droplets is also sucked into the desolvation tube 11, but since the desolvation tube 11 is appropriately heated, the evaporation of the solvent is accelerated while the charged droplets pass through the desolvation tube 11, and the generation of ions progresses.

The ion entering the first intermediate vacuum chamber 3 on the gas flow is appropriately cooled by coming into contact with the residual gas, and proceeds while being captured by the high-frequency electric field formed by the Q array ion guide 12. This ion converges near the ion passage hole 13a at the apex of the skimmer 13, and is sent to the second intermediate vacuum chamber 4 through the ion passage hole 13a. The ion entering the second intermediate vacuum chamber 4 is captured by the high-frequency electric field formed by the quadrupole ion guide 14 and proceeds while converging near the ion optical axis C. Then, the ion is sent to the analysis chamber 5 through the ion passage hole 15a formed in the aperture electrode 15.

In the analysis chamber 5, ions are introduced to the main filter 161 through the prefilter 162. The prefilter 162 is to correct disturbance of the electric field formed near the leading edge of the rod electrode of the main filter 161, whereby the ions are smoothly and efficiently introduced into the main filter 161. A voltage obtained by superimposing a high-frequency voltage on a direct-current voltage is applied to each rod electrode of the main filter 161, and only ions having a specific mass-to-charge ratio corresponding to the voltages pass through the main filter 161 and reach the ion detector 17. The ion detector 17 generates an ion intensity signal having an intensity corresponding to the amount of reached ions, and sends this signal to the data processing unit 40.

By changing the direct-current voltage and the high-frequency voltage applied to each rod electrode of the main filter 161 while maintaining a predetermined relationship, the mass-to-charge ratio of ions that can pass through the main filter 161 changes. Thus, mass-to-charge ratio scanning over a predetermined mass-to-charge ratio range is performed, and the data processing unit 40 can create a mass spectrum (profile spectrum) indicating a change in the ion intensity signal over the mass-to-charge ratio range.

Next, in the mass spectrometer of the present example, an operation at the time of automatic adjustment of automatically searching an optimum value of the direct-current voltage applied to the ion optical element such as the Q array ion guide 12 will be described. This automatic adjustment is performed at an appropriate timing, for example, after starting the device. The "direct-current voltage" mentioned here is a direct-current bias voltage (or direct-current offset voltage) set for each ion optical element. For example, in the quadrupole mass filter 16, the direct-current voltage is not a direct-current voltage scanned for mass separation in the main filter 161 but a direct-current bias voltage commonly applied to the four rod electrodes constituting the quadrupole mass filter 16.

At the time of automatic adjustment, instead of the eluate from the LC, a prepared standard sample (the sample component is polyethylene glycol (PEG), polypropylene glycol (PPG), or the like) is introduced into the ESI probe 10, and a selected ion monitoring (SIM) measurement which selectively analyzes ions having a mass-to-charge ratio corresponding to the sample component is performed to acquire an ion intensity signal.

The auto-tuning controller 32 first reads, from a control parameter storage unit 33, information of the direct-current voltage value stored as a default value or the direct-current voltage value used in the most recent analysis, and sends the information to each of the first power source unit 21 to the seventh power source unit 27. Each of the first power source unit 21 to the seventh power source unit 27 generates a direct-current voltage of a specified voltage value, and applies, to the ion optical elements associated with the power source units, the direct-current voltage as it is or a voltage obtained by adding the direct-current voltage to another high-frequency voltage and a voltage obtained by adding the direct-current voltage and a voltage obtained by superimposing another direct-current voltage on another high-frequency voltage. For example, the first power source unit 21 applies only a direct-current voltage to the desolvation tube 11, and the second power source unit 22 applies a voltage obtained by adding a direct-current voltage and a high-frequency voltage to each electrode constituting the Q array ion guide 12. Similarly to the time of analysis, a predetermined direct-current voltage is applied to each the tip of the ESI probe 10 and the ion detector 17 from a power source unit not shown.

As described above, when a standard sample is introduced into the ESI probe 10 in a state where a predetermined voltage is applied to each part, a predetermined component in the standard sample is ionized, and the generated ion enter the quadrupole mass filter 16 through the desolvation tube 11, the Q array ion guide 12, the skimmer 13, the quadrupole ion guide 14, and the aperture electrode 15 in this order. Then, the ion derived from a predetermined component passes through the quadrupole mass filter 16, reaches the ion detector 17, and is detected. The higher the ion passage efficiency in the ion path from the desolvation tube 11 to the ion detector 17 is, the higher the ion intensity signal by the ion detector 17 becomes. Therefore, the auto-tuning controller 32 searches for a direct-current voltage at which the intensity data of the ion derived from the predetermined component obtained in the data processing unit 40 becomes as high as possible. However, the method of changing the direct-current voltage when searching for the optimum direct-current voltage is different between the mass spectrometer of the present example and the conventional mass spectrometer.

Figure 2A:
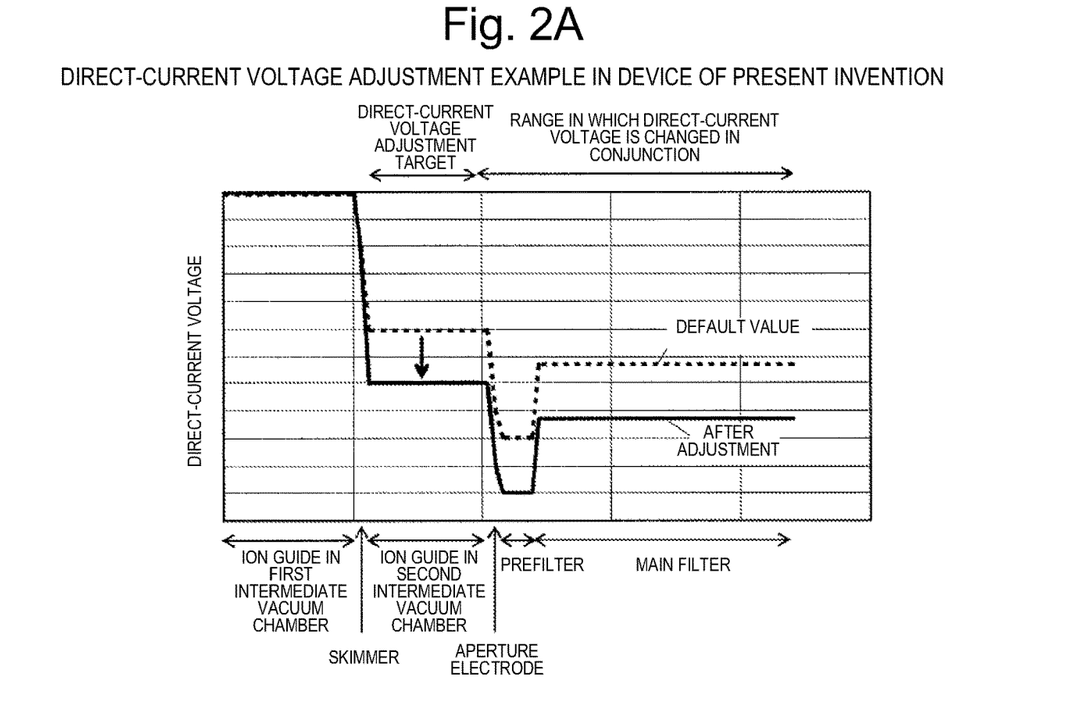
FIGS. 2A-2B are charts for explaining a difference in a direct-current voltage automatic adjustment method between a mass spectrometer of the present example and a conventional mass spectrometer.
Figure 2B:
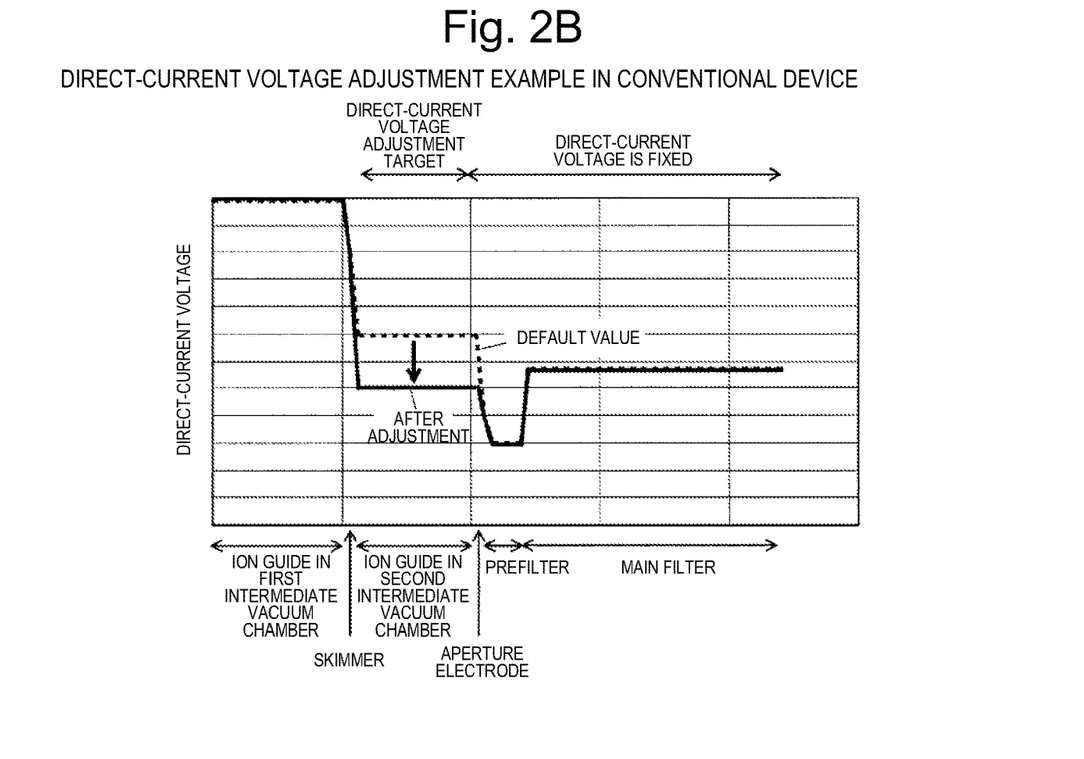

FIG. 2B is an explanatory diagram showing an adjustment method of the direct-current voltage when searching for the optimum direct-current voltage of the quadrupole ion guide 14 in the conventional device, and schematically shows the level of the direct-current voltage applied to each ion optical element between the Q array ion guide 12 and the quadrupole mass filter 16. Here, the direct-current voltages of the ion optical elements on the upstream side of the quadrupole ion guide 14 in the ion passing direction (right direction), i.e., the Q array ion guide 12 and the skimmer 13, have been adjusted. In order to optimize the direct-current voltage of the quadrupole ion guide 14, intensity data of ions derived from a predetermined component is acquired while changing the direct-current voltage applied to the quadrupole ion guide 14, and a direct-current voltage at which the intensity is maximized is searched.

In the example of FIG. 2B, the direct-current voltage is changed by the automatic adjustment from the default value indicated by the dotted line to the value indicated by the solid line. At this time, the direct-current voltage applied to the ion optical elements other than the quadrupole ion guide 14 to be adjusted is not changed. In this case, when the direct-current voltage applied to the quadrupole ion guide 14 is changed, two voltage differences, i.e., a voltage difference between the direct-current voltage applied to the skimmer 13, which is its preceding stage, and the direct-current voltage applied to the quadrupole ion guide 14, and a voltage difference between the direct-current voltage applied to the aperture electrode 15, which is its subsequent stage, and the direct-current voltage applied to the quadrupole ion guide 14 simultaneously change. Thus, when the direct-current voltage applied to a certain ion optical element is changed, the direct-current voltage differences between the two portions before and after the ion optical element always change simultaneously.

For example, even if a voltage difference $\Delta V$ between the direct-current voltage applied to the aperture electrode 15 in the subsequent stage and the direct-current voltage applied to the quadrupole ion guide 14 is once determined by determining the direct-current voltage of the quadrupole ion guide 14, when the direct-current voltage applied to the aperture electrode 15 is changed next in order to optimize the direct-current voltage of the aperture electrode 15, the voltage difference $\Delta V$ once determined previously is changed. Therefore, in a case where the contribution of this voltage difference $\Delta V$ is large in optimizing the direct-current voltage of the quadrupole ion guide 14, change in the voltage difference $\Delta V$ when optimizing the direct-current voltage of the aperture electrode 15 can cause the direct-current voltage of the quadrupole ion guide 14 not to be the optimum value. Since such a state occurs in each ion optical element, the state of the direct-current voltage after the final adjustment tends to be a state that is not optimum in terms of detection sensitivity.

When the direct-current voltage applied to the quadrupole ion guide 14 is changed, the direct-current potential difference from the quadrupole mass filter 16 on the downstream side of the quadrupole ion guide 14 is also changed at the same time. The energy of an ion incident on the quadrupole mass filter 16 is normally affected by a potential difference between the direct-current potential of the quadrupole mass filter 16 and the direct-current potential of an ion optical element (e.g., the quadrupole ion guide 14) positioned on the upstream side of the quadrupole mass filter 16. Therefore, in the conventional quadrupole mass spectrometer, the energy of an ion incident on the quadrupole mass filter 16 is changed by the voltage adjustment of the ion optical element positioned upstream of the quadrupole mass filter 16, whereby the mass resolution is sometimes deteriorated.

FIG. 2A is an explanatory diagram showing an adjustment method of the direct-current voltage when searching for the optimum direct-current voltage of the quadrupole ion guide 14 in the mass spectrometer of the present example, and, similarly to FIG. 2B, schematically shows the level of the direct-current voltage applied to each ion optical element between the Q array ion guide 12 and the quadrupole mass filter 16.

It is the same as in the conventional apparatus that the direct-current voltage applied to the quadrupole ion guide 14 is changed by the automatic adjustment from the default value indicated by the dotted line to the value indicated by the solid line. However, at this time, the direct-current voltage applied to all the ion optical elements on and after the adjustment target quadrupole ion guide 14 is also changed in the same manner. Therefore, when the direct-current voltage applied to the quadrupole ion guide 14 is changed, only the voltage difference between the direct-current voltage applied to the skimmer 13, which is the preceding stage of the quadrupole ion guide 14, and the direct-current voltage applied to the quadrupole ion guide 14 changes, and the voltage difference between the direct-current voltage applied to the aperture electrode 15, which is the subsequent stage, and the direct-current voltage applied to the quadrupole ion guide 14 does not change. Thus, in the mass spectrometer of the present example, when the direct-current voltage applied to a certain ion optical element is changed, only the direct-current voltage difference of the immediately preceding one portion is changed.

Due to this, in the mass spectrometer of the present example, when optimizing the direct-current voltage applied to the ion optical element, the voltage difference between the direct-current voltage applied to the adjustment target ion optical element and the direct-current voltage applied to another ion optical element positioned just in front of that can be determined one by one in order, and the voltage difference once determined does not change even when the direct-current voltage applied to another ion optical element is changed. Therefore, in a state where the direct-current voltages of all the ion optical elements are finally adjusted, all direct-current electric field between two adjacent ion optical elements becomes at or near the optimum state for ions to pass through. As a result, a high ion passage efficiency can be achieved.

Furthermore, even when the direct-current voltage applied to the adjustment target ion optical element is changed, the direct-current potential difference between the ion optical element and the quadrupole mass filter 16 is not changed, and hence the incident energy of an ion incident on the quadrupole mass filter 16 is maintained constant regardless of the direct-current voltage applied to the adjustment target ion optical element. Thus, it is possible to suppress the change of the peak shape on the mass spectrum and to alleviate the deterioration in mass resolution.

Figure 3:
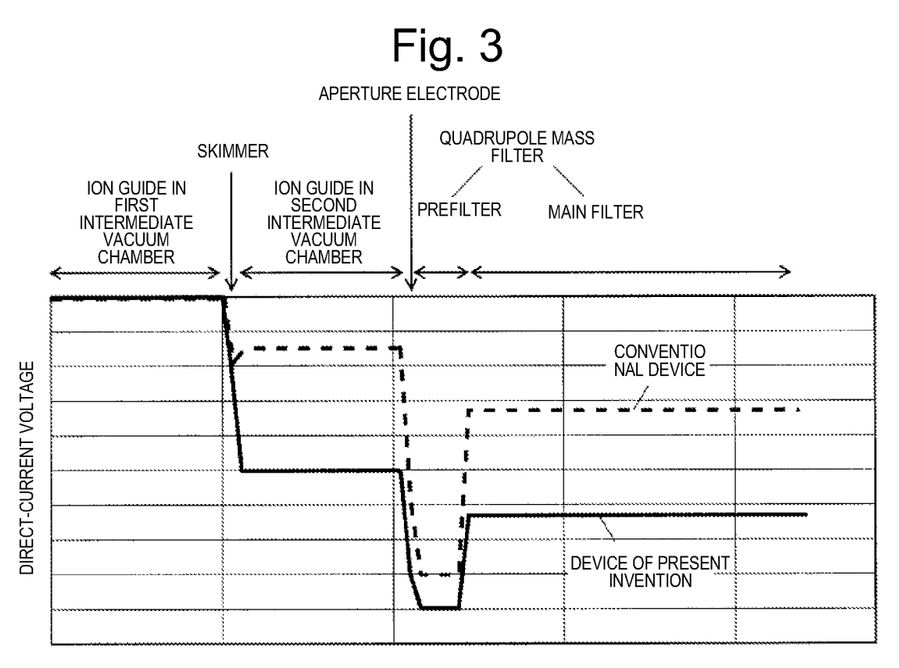
FIG. 3 is a chart showing a comparison of direct-current voltages of each ion optical element after automatic adjustment between a mass spectrometer of the present example and a conventional mass spectrometer.

FIG. 3 is a chart showing an example of comparison of direct-current voltages of each ion optical element after automatic adjustment between a mass spectrometer of the present example and a conventional mass spectrometer. As described above, in the mass spectrometer of the present example and the conventional mass spectrometer, the direct-current voltage applied to the ion optical element is changed in a different manner when the direct-current voltage is optimized, and hence a difference occurs in the level of the voltage in the finally adjusted state as shown in FIG. 3.

The auto-tuning controller 32 sequentially determines the optimum value of the direct-current voltage to be applied to each ion optical element as described above, and if the optimum value of the direct-current voltage is obtained for all the ion optical elements, it is stored in the control parameter storage unit 33. In a case where different types of standard samples are prepared, automatic adjustment of the direct-current voltage for different mass-to-charge ratios is performed in the similar manner using each standard sample, and the obtained result is stored in the control parameter storage unit 33. Then, at the time of subsequently performed analysis of the sample, the analysis controller 31 controls the power source units 21 to 27 on the basis of the voltage value data stored in the control parameter storage unit 33 to determine the direct-current voltage to be applied to each ion optical element. This allows the target component in the target sample to be detected with high sensitivity. In addition, high mass resolution can be ensured.

Figure 4A:
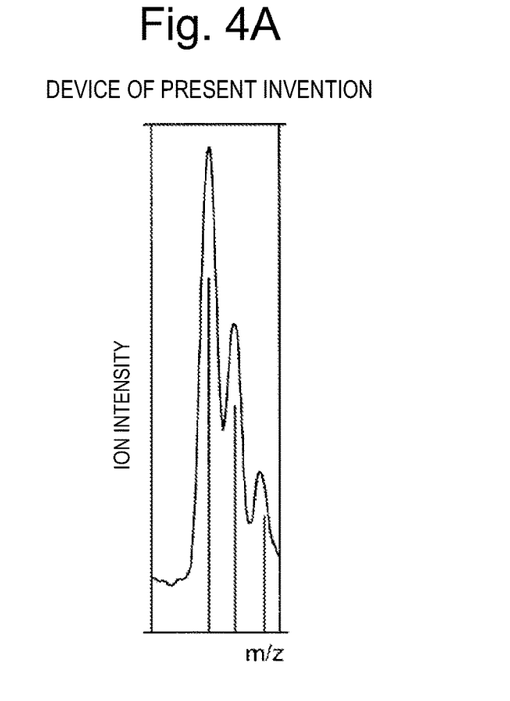
FIGS. 4A-4B are charts showing a comparison of peak waveforms after automatic adjustment between a mass spectrometer of the present example and a conventional mass spectrometer.
Figure 4B:
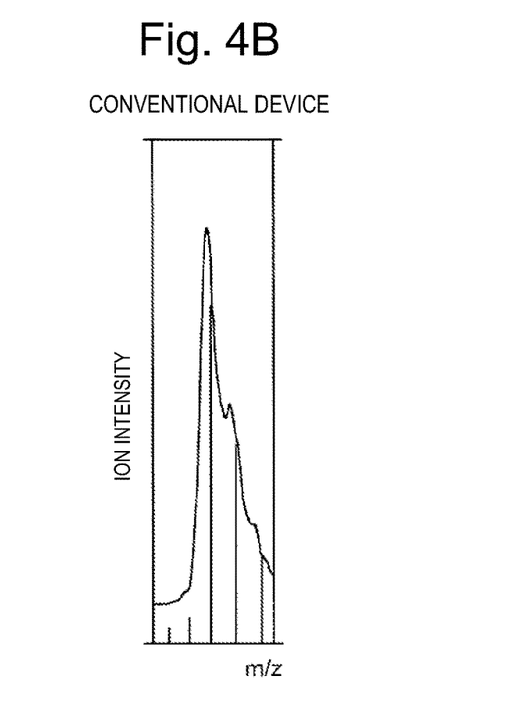

FIGS. 4A-4B are charts showing a comparison of peak waveforms on the mass spectrum in a state after automatic adjustment between a mass spectrometer of the present example and a conventional mass spectrometer. In the conventional mass spectrometer as shown in FIG. 4B, the peak waveform shape is poor in a state where the automatic adjustment is completed, and the isotope peaks are not sufficiently separated. On the other hand, in the mass spectrometer of the present example as shown in FIG. 4A, the peak waveform shape is good and the isotope peaks are sufficiently separated. Thus, by performing automatic adjustment of the direct-current voltage as described above, the waveform shape of the peak on the mass spectrum is improved, the deterioration in mass resolution is alleviated, and for example, the mass-to-charge ratio value of the ions corresponding to each peak can be accurately obtained.

In the mass spectrometer of the example described above, the atmospheric pressure ion source uses the ESI, but it is natural that the atmospheric pressure ion source may use the APCI, the APPI, or the like.

In the mass spectrometer of the example described above, two intermediate vacuum chambers are provided between the ionization chamber and the analysis chamber, but a mass spectrometer provided with three or more intermediate vacuum chambers is also known. It is a matter of course that the present invention is also applicable to such a mass spectrometer.

Although the mass spectrometer of the example described above is a single type quadrupole mass spectrometer, it is natural that the present invention is also applicable to a triple quadrupole mass spectrometer, a quadrupole-time-of-flight (Q-TOF) mass spectrometer, and the like. That is, the present invention is applicable to any mass spectrometer that transports ions to a subsequent stage by using a plurality of ion optical elements.

Furthermore, since the above example is merely an example of the present invention, it is obvious that appropriate variation, addition, and modification made within the scope of the purpose of the present invention for points other than the above description are included in the scope of the claims of the present application.

REFERENCE SIGNS LIST

1 . . . Casing
2 . . . Ionization Chamber

3 . . . First Intermediate Vacuum Chamber
4 . . . Second Intermediate Vacuum Chamber
5 . . . Analysis Chamber
10 . . . ESI Probe
11 . . . Desolvation Tube
12 . . . Q Array Ion Guide
13 . . . Skimmer
13a . . . Ion Passage Hole
14 . . . Quadrupole Ion Guide
15 . . . Aperture Electrode
15a . . . Ion Passage Hole
16 . . . Quadrupole Mass Filter
161 . . . Main Filter
162 . . . Prefilter
17 . . . Ion Detector
21-27 . . . Power Source Unit
30 . . . Controller
31 . . . Analysis Controller
32 . . . Auto-Tuning Controller
33 . . . Control Parameter Storage Unit
40 . . . Data Processing Unit
C . . . Ion Optical Axis

The invention claimed is:

1. A mass spectrometer including an ion source configured to ionize a component in a sample, an ion detector configured to detect an ion generated by the ion source or an ion derived from the ion, and a plurality of ion optical elements configured to affect an ion behavior, the plurality of ion optical elements including a mass separator which is disposed between the ion source and the ion detector and configured to separate an ion generated by the ion source or an ion derived from the ion in accordance with its mass-to-charge ratio, the mass spectrometer comprising:
   a voltage generation unit configured to apply a direct-current voltage to each of the plurality of ion optical elements; and
   an automatic adjustment controller configured to adjust a direct-current voltage by controlling the voltage generation unit so as to change the direct-current voltage applied to the ion optical element while observing an ion intensity with respect to a predetermined component, wherein, when adjusting a direct-current voltage applied to an adjustment target ion optical element, which is one of the plurality of ion optical elements, the automatic adjustment controller controls the voltage generation unit so that a direct-current voltage applied to one or a plurality of ion optical elements positioned in a subsequent stage of the adjustment target ion optical element is changed by a same amount as a direct-current voltage applied to the adjustment target ion optical element.

2. The mass spectrometer according to claim 1, wherein one or a plurality of ion optical elements positioned in a subsequent stage of the adjustment target ion optical element include a quadrupole mass filter.

3. The mass spectrometer according to claim 1, wherein the ion source is an atmospheric pressure ion source, the mass separator and the ion detector are disposed in an analysis chamber having a high vacuum, and two or more intermediate vacuum chambers in which a degree of vacuum is increased in a stepwise manner are provided between the atmospheric pressure ion source and the analysis chamber, and
the adjustment target ion optical element is an ion guide disposed in a first intermediate vacuum chamber positioned in a next stage of the atmospheric pressure ion source.

4. The mass spectrometer according to claim 1, wherein the ion source is an atmospheric pressure ion source, the mass separator and the ion detector are disposed in an analysis chamber having a high vacuum, and two or more intermediate vacuum chambers in which a degree of vacuum is increased in a stepwise manner are provided between the atmospheric pressure ion source and the analysis chamber, and
the adjustment target ion optical element is an ion lens having an opening through which ions pass, provided in a partition wall separating a first intermediate vacuum chamber positioned in a next stage of the atmospheric pressure ion source from a second intermediate vacuum chamber positioned in a next stage of the first intermediate vacuum chamber.

5. The mass spectrometer according to claim 1, wherein the ion source is an atmospheric pressure ion source, the mass separator and the ion detector are disposed in an analysis chamber having a high vacuum, and two or more intermediate vacuum chambers in which a degree of vacuum is increased in a stepwise manner are provided between the atmospheric pressure ion source and the analysis chamber, and
the adjustment target ion optical element is an ion guide disposed in a second intermediate vacuum chamber positioned in the second stage behind the atmospheric pressure ion source.

6. The mass spectrometer according to claim 1, wherein the ion source is an atmospheric pressure ion source, the mass separator and the ion detector are disposed in an analysis chamber having a high vacuum, and two or more intermediate vacuum chambers in which a degree of vacuum is increased in a stepwise manner are provided between the atmospheric pressure ion source and the analysis chamber, and
the adjustment target ion optical element is an ion lens having an opening through which ions pass, provided in a partition wall separating a second intermediate vacuum chamber positioned in the second stage behind the atmospheric pressure ion source from a third intermediate vacuum chamber positioned further in a next stage of the second intermediate vacuum chamber or an analysis chamber.

7. The mass spectrometer according to claim 1, wherein the ion source is an atmospheric pressure ion source, the mass separator and the ion detector are disposed in an analysis chamber having a high vacuum, and three or more intermediate vacuum chambers in which a degree of vacuum is increased in a stepwise manner are provided between the atmospheric pressure ion source and the analysis chamber, and
the adjustment target ion optical element is an ion guide disposed in a third intermediate vacuum chamber positioned in the third stage behind the atmospheric pressure ion source.

8. The mass spectrometer according to claim 1, wherein the ion source is an atmospheric pressure ion source, the mass separator and the ion detector are disposed in an analysis chamber having a high vacuum, and three or more intermediate vacuum chambers in which a degree of vacuum is increased in a stepwise manner are provided between the atmospheric pressure ion source and the analysis chamber, and
the adjustment target ion optical element is an ion lens having an opening through which ions pass, provided in a partition wall separating a third intermediate vacuum chamber positioned in the third stage behind the atmospheric pressure ion source from a fourth intermediate vacuum chamber positioned further in a next stage of the third intermediate vacuum chamber or an analysis chamber.

* * * * *